United States Patent
Steinke

(10) Patent No.: US 11,409,670 B2
(45) Date of Patent: Aug. 9, 2022

(54) MANAGING LOCK COORDINATOR REBALANCE IN DISTRIBUTED FILE SYSTEMS

(71) Applicant: EMC IP Holding Company LLC, Hopkinton, MA (US)

(72) Inventor: Ron Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/124,694

(22) Filed: Dec. 17, 2020

(65) Prior Publication Data

US 2022/0197830 A1    Jun. 23, 2022

(51) Int. Cl.
    G06F 12/14      (2006.01)
    G06F 12/0891    (2016.01)
    G06F 12/0802    (2016.01)

(52) U.S. Cl.
    CPC ...... *G06F 12/1466* (2013.01); *G06F 12/0802* (2013.01); *G06F 12/0891* (2013.01); *G06F 2212/604* (2013.01)

(58) Field of Classification Search
    CPC ............. G06F 12/0802; G06F 12/0891; G06F 12/1466; G06F 2212/604
    See application file for complete search history.

(56) References Cited

U.S. PATENT DOCUMENTS

| | | | |
|---|---|---|---|
| 6,775,703 B1 * | 8/2004 | Burns | G06F 12/0866 709/223 |
| 9,747,323 B1 | 8/2017 | Kilpatrick et al. | |
| 2004/0220931 A1 * | 11/2004 | Guthridge | G06F 16/1774 |

OTHER PUBLICATIONS

International Search Report and Written Opinion received for PCT Application Serial No. PCT/US2021/028999 dated Jul. 9, 2021, 13 pages.

* cited by examiner

*Primary Examiner* — Aracelis Ruiz

(74) *Attorney, Agent, or Firm* — Amin, Turocy & Watson, LLP

(57) ABSTRACT

Managing lock coordinator rebalance in distributed file systems is provided herein. A node device of a cluster of node devices can comprise a processor and a memory that stores executable instructions that, when executed by the processor, facilitate performance of operations. The operations can comprise determining an occurrence of a group change between a cluster of node devices and executing a probe function based on the occurrence of the group change. Further, the operations can comprise reasserting first locks of a group of locks based on a result of the probe function indicating reassertion of the first locks. The second locks of the group of locks, other than the first locks, are not reasserted based on the result of the probe function. The cluster of node devices can operate as a distributed file system.

20 Claims, 10 Drawing Sheets

| FIRST NODE | SECOND NODE | THIRD NODE | FOURTH NODE |
|---|---|---|---|
| RESOURCE ALLOCATION OF ORIGINAL CLUSTER BEFORE GROUP CHANGE | | | |

| FIRST NODE | SECOND NODE | THIRD NODE | FOURTH NODE | FIFTH NODE |
|---|---|---|---|---|
| RESOURCE ALLOCATION AFTER ADDING A NODE | | | | |

| FIRST NODE | THIRD NODE | FOURTH NODE |
|---|---|---|
| RESOURCE ALLOCATION AFTER REMOVING A NODE | | |

MANAGING LOCK COORDINATOR REBALANCE IN DISTRIBUTED FILE SYSTEMS

TECHNICAL FIELD

The subject disclosure relates generally to distributed file systems. More specifically, the subject disclosure relates to managing lock coordinator rebalance in distributed file systems, e.g., facilitating deferred lock assertion and cache invalidation during lock coordinator rebalance.

BACKGROUND

Distributed storage systems and/or object storage systems can provide a wide range of storage services while achieving high scalability, availability, and serviceability. Operations of distributed files systems (also referred to as distributed storage systems and/or distributed object storage systems) can include a locking mechanism to maintain data consistency of the associated shared files. When changes are made to the nodes in the distributed file system (a node is removed, a node is added, a first node is removed and a second node is added, and so on). Coordination of locks need to be redistributed within the distributed file system. During this process, the distributed file system can be temporarily locked until the group change process is completed. Thus, pending operations will be suspended, which affects performance of the distributed file system, resulting in a negative end-user experience.

The above-described context with respect to conventional storage systems is merely intended to provide an overview of current technology and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a first node device of a cluster of node devices. The first node device can comprise a processor and a memory that stores executable instructions that, when executed by the processor, facilitate performance of operations. The operations can comprise determining an occurrence of a group change between a cluster of node devices and executing a probe function based on the occurrence of the group change. Further, the operations can comprise reasserting first locks of a group of locks based on a result of the probe function indicating reassertion of the first locks. The second locks of the group of locks, other than the first locks, are not reasserted based on the result of the probe function. The cluster of node devices can operate as a distributed file system.

According to an example, reasserting the first locks can comprise determining that a lock loss callback thread uses respective locks of the first locks and that respective cache associated with a thread is available for invalidation.

In some implementations, the operations can comprise prior to the reasserting the first locks, receiving a set of values in response to the probe function. A first value of the set of values indicates no cache is to be invalidated. A second value of the set of values indicates a lock loss callback thread does not utilize a lock and respective cache associated with a thread is available for invalidation. A third value of the set of values indicates the lock loss callback thread utilizes the lock and that respective cache associated with the thread is available for invalidation. Further to these implementations, the operations can comprise determining that the second locks are associated with the first value and the second value and determining that the first locks are associated with the third value.

In accordance with some implementations, determining the occurrence of the group change can comprise determining a removal of an existing node device from the cluster of node devices. Alternatively, determining the occurrence of the group change can comprise determining an addition of a new node device to the cluster of node devices. In some cases, determining an addition of a new node device to the cluster of node devices can comprise determining both the removal of the existing node device and the addition of the new node device.

In an example, incompatible locks are created when two threads hold exclusive locks on a same resource. In another example, executing the probe function can comprise executing local functions while bypassing a coordinator node included in the cluster of node devices. According to another example, the operations can comprise discarding block cache and inode cache associated with the second locks.

In accordance with some implementations, a lock of the group of locks is associated with a lock coordinator node between the cluster of node devices. Further to these implementations, the operations comprise enabling tracking of a defined lock type requested for each resource from the lock coordinator node.

Another embodiment relates to a method that can comprise ascertaining, by a first node device comprising a processor and part of a group of node devices, that a group change has occurred at the group of node devices. Further, the method can comprise reasserting, by the first node device, first locks of a group of locks based on a result of a probe function indicating reassertion of the first locks. The probe function is executed based on ascertaining the group change has occurred. The method also can comprise discarding, by the first node device, second locks of the group of locks based on the result of the probe function indicating the reassertion of the second locks is not needed. The first locks and the second locks are different locks of the group of locks.

According to some implementations, reasserting the first locks can comprise determining a lock loss callback thread uses respective locks of the first locks and that respective cache associated with a thread is available for invalidation.

In some implementations, discarding the second locks can comprise determining a lock loss callback thread does not use respective locks of the first locks and that respective cache associated with a thread is available for invalidation. Alternatively or additionally, discarding the second locks can comprise determining no cache is to be invalidated.

The method can comprise, prior to the reasserting, executing the probe function comprising bypassing a coordinator node included in the group of node devices based on execution of one or more local functions. In an example, the group of locks are exclusive locks in a distributed file system.

The group change can comprise at least one of an additional node added to the group of node devices and a removal of a node from the group of node devices.

Another embodiment relates to a non-transitory machine-readable medium, comprising executable instructions that, when executed by a processor, facilitate performance of operations. The operations can comprise executing a probe function based on a determination that a group change is occurring at a cluster of node devices configured to operate as a distributed file system. The probe function evaluates respective locks and associated cache of a group of resources. The operations also can comprise determining a first set of locks of the respective locks are to be reasserted based on results of the probe function. Further, the operations can comprise reasserting the first set of locks, where a second set of locks of the respective locks, different from the first set of locks, are not reasserted based on results of the probe function.

Reasserting the first set of locks can comprise determining that a lock loss callback thread uses respective locks of the first set of locks and that respective cache associated with a thread is available for invalidation. Executing the probe function can comprise executing local functions while bypassing a coordinator node included in the cluster of node devices.

According to some implementations, prior to the reasserting the first set of locks, the operations comprise receiving a set of values in response to the probe function. A first value of the set of values indicates no cache is to be invalidated. A second value of the set of values indicates a lock loss callback thread does not utilize a lock and respective cache associated with a thread is available for invalidation. A third value of the set of values indicates the lock loss callback thread utilizes the lock and that respective cache associated with the thread is available for invalidation. Further, the operations can comprise determining that the second set of locks are associated with the first value and the second value and determining that the first set of locks are associated with the third value.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2A illustrates an example, non-limiting, block diagram of resource allocation of an original cluster in a distributed file system prior to a group change in accordance with one or more embodiments described herein;

FIG. 2B illustrates an example, non-limiting, block diagram of resource allocation of a changed cluster in a distributed file system after a node has been added in accordance with one or more embodiments described herein;

FIG. 2C illustrates an example, non-limiting, block diagram of resource allocation of a changed cluster in a distributed file system after a node has been removed in accordance with one or more embodiments described herein;

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Example embodiments are directed to facilitating deferred lock assertion and cache invalidation during lock coordinator rebalance, such as based on a group change. As discussed herein, based on detection of a group change, a probe function can be executed which returns one of a group of values based on whether or not there is cache to invalidate and, if there is cache to invalidate whether a lock loss callback thread needs the lock to invalidate the cache. If the lock loss callback thread needs the lock to invalidate the cache, the lock can be reasserted. Otherwise, the lock is not reasserted.

One example computing platform that can optionally incorporate the lock reassertion techniques disclosed herein is an ISILON OneFS® cluster provided by DELL®, Inc. It can be appreciated that OneFS® clusters are one of many optional cluster computing technologies, any of which can incorporate the teachings of this disclosure.

Figure 1:
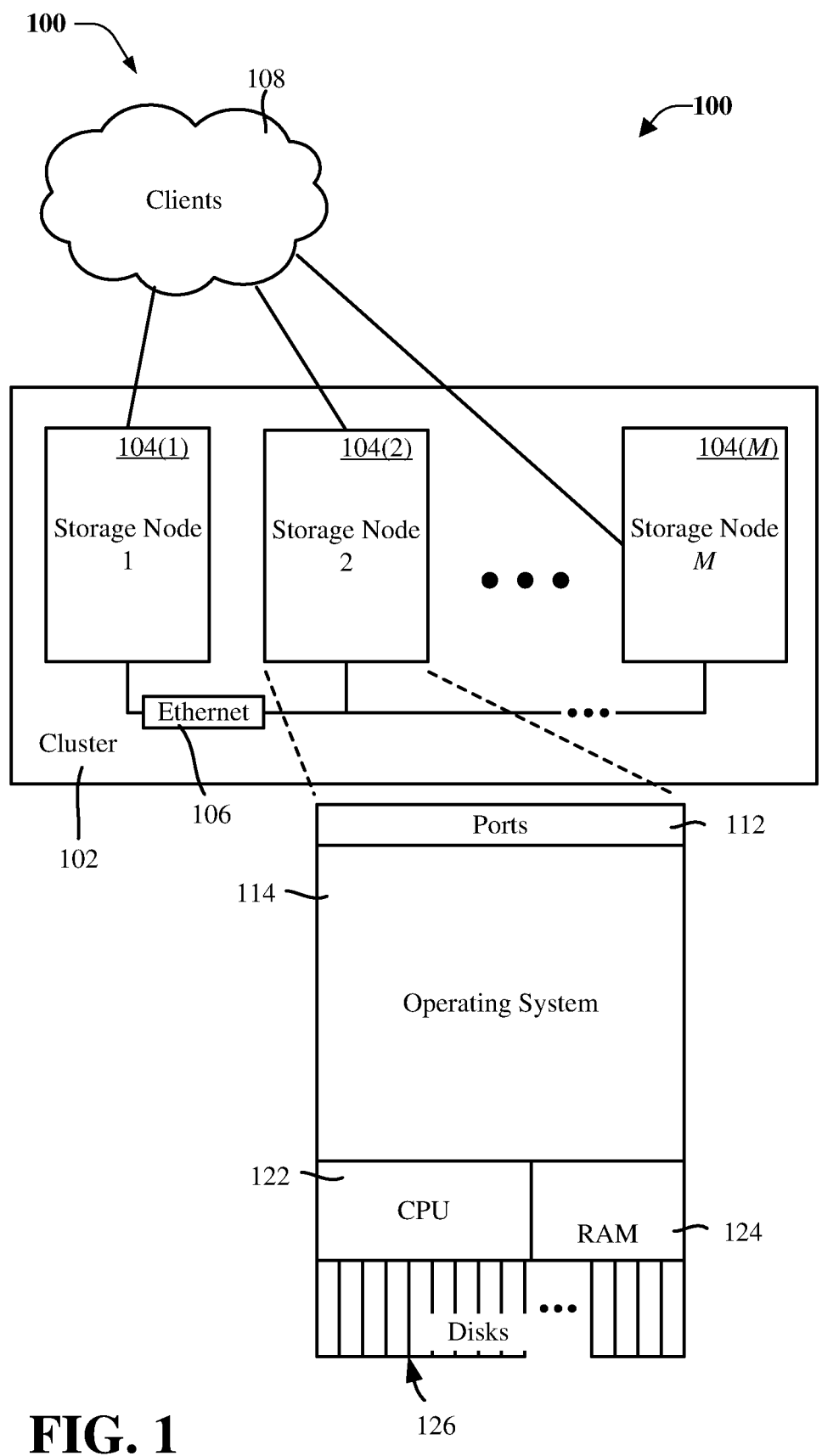
FIG. 1 illustrates an example cluster of computing devices, in accordance with one or more embodiments described herein.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the storage node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

In a non-limiting example, OneFS® distributed filesystem has a tension between initiator cache size and lock coordinator rebalance during group change. A large cache improves latency during filesystem operations. However, every item in the initiator cache is protected by a lock from the two-tier lock system cached on the initiator node. During lock coordinator rebalance, the new lock coordinators must be notified of every one of these cached locks. This is referred to as reasserting the cached locks on a node. A large number of cached locks can cause unacceptable system hangs during group change (e.g., the system is temporarily locked). The embodiments provided herein attempt to overcome the above noted challenges by delaying the lock notification for almost all locks until after group change has completed. This allows for the increase of the initiator cache size while simultaneously reducing group change times.

In further detail, OneFS® implements a two-tiered distributed locking system, referred to as "lk." The two-tiered distributed locking system means that locks for a resource are coordinated by a given node, referred to as a coordinator, which can be petitioned for locks by nodes, referred to as initiators, of behalf of threads on the initiator nodes. Thus, when a thread requires a lock to perform work on a resource, that request might need to not only go to it local initiator, but also be sent off-node to the cluster-wide coordinator for that resource before a lock can be granted and the thread can be unblocked.

FIG. 2A illustrates an example, non-limiting, block diagram of resource allocation of an original cluster 200 in a distributed file system prior to a group change in accordance with one or more embodiments described herein. This example illustrates four node clusters (a first node, a second node, a third node, and a fourth node) prior to the group change. The size of each node represents the number of resources of the node. However, this is for example purposes only and a distributed file system is not limited to four nodes nor the respective number of resources illustrated for each node. Further, multiple resources can be assessed for each node, which can be dependent on the storage space capacity of the node, processing resources of the node, cache memory and/or system memory resources of the node, and so on. Thus, some nodes can handle more responsibility for coordinating locks (e.g., coordinate more locks) than other nodes, which handle less resources.

FIG. 2B illustrates an example, non-limiting, block diagram of resource allocation of a changed cluster 202 in a distributed file system after a node has been added in accordance with one or more embodiments described herein. More specifically, FIG. 2B illustrates the resource allocation after a node has been added to the original cluster 200. In this case, a fifth node has been added. Although illustrated as addition of a single node, in some cases more than one node could be added.

FIG. 2C illustrates an example, non-limiting, block diagram of resource allocation of a changed cluster 204 in a distributed file system after a node has been removed in accordance with one or more embodiments described herein. More specifically, FIG. 2C illustrates the resource allocation after a node has been removed from the original cluster 200. In this case, the second node has been removed. Although illustrated as removal of a single node, in some cases more than one node could be removed. Further, according to some implementations, one or more nodes could be added and/or one or more nodes could be removed from the original cluster (or subsequent clusters). Resources previously assigned to the removed node can be reallocated to the remaining nodes.

Traditionally, various manners of adjusting for a group change have been considered. For example, consistent hash has been applied where, when a node goes down, any locks on coordinators which remain up are not moved. The implementation of a consistent hash can reduce the number of lock notifications that must be sent. In another example, during the notification process, any locks which, while cached themselves, are not currently protecting other cache state can be discarded. Another manner of adjusting for a group change is a drain service. Before a group change, with the drain service, the size of cached data and the number of cached locks is significantly reduced. However, this only works if the group change is able to be anticipated and, thus, does not help the case of an unexpected socket disconnect between nodes.

The disclosed embodiments can delay lock notification for almost all locks until after group change has been completed. Thus, the disclosed embodiments can increase initiator cache size while simultaneously reducing group change times.

Figure 3:
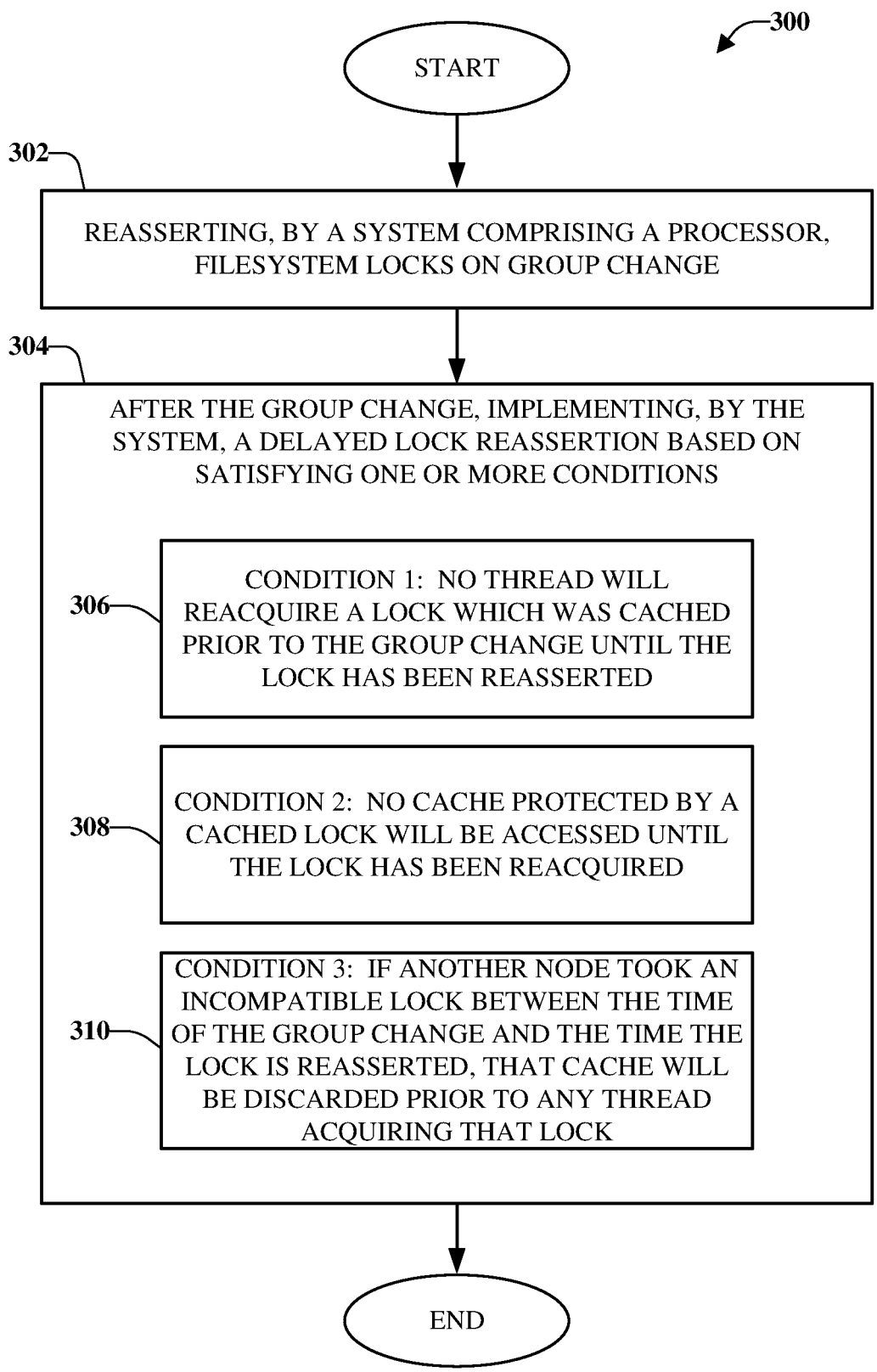
FIG. 3 illustrates a flow diagram of an example, non-limiting, computer-implemented method for delayed lock reassertion conditions that should be satisfied after group change in accordance with one or more embodiments described herein.

FIG. 3 illustrates a flow diagram of an example, non-limiting, computer-implemented method 300 for delayed lock reassertion conditions that should be satisfied after group change in accordance with one or more embodiments described herein.

In further detail, at 302, filesystem locks are reasserted on group change. Accordingly, based on a determination that a group change is scheduled to occur, or is occurring, the reassertion of the filesystem locks can be performed. Such reassertion can guarantee, after the group change, that no two threads in the system hold incompatible locks (e.g., two threads with exclusive locks on the same resource). This same guarantee can be provided by implementing a delayed lock reassertion, at 304.

The delayed lock reassertion can be implemented by satisfying various conditions. For example, as indicated at 306 of the computer-implemented method 300, a first condition can be that no thread will reacquire a lock which was cached prior to the group change until the lock has been reasserted. As indicated at 308, a second condition can be that no cache protected by a cached lock will be accessed until the lock has been reacquired. A third condition, as indicated at 310, can be that, if another node took an incompatible lock between the time of the group change and the time the lock is reasserted, that cache will be discarded prior to any thread acquiring that lock.

The lock coordinator can track the strongest lock taken for each resource during the window between group change and reassertion, so that lock coordinator can inform an initiator node that it needs to discard its cache.

Traditionally, when a lock coordinator asks a lock initiator to give up its lock, the initiator invalidates any cache protected by that lock in two steps. First, the initiator calls a probe function, which indicates whether any cache invalidation is needed. If anything must be invalidated, the lock system then calls a second function (lock loss callback, llcb) to invalidate the cache. The critical difference between these two functions is that, during the probe function, the thread running the probe does not hold the lock that is to be released. During the llcb, on the other hand, the thread does hold the lock. This is not acceptable when invalidating cache during failed lock reassertion, as the cache is to be destroyed before any thread acquires the lock.

To resolve this issue, according to the various embodiments provided herein, the probe function is modified to return three possible values instead of two possible values. A first value is that there is no cache to invalidate. A second value is that there is cache to invalidate, but the llcb thread does not require the lock. The third value is that there is cache to invalidate, and the llcb thread requires the lock.

Return of the third value should be rare. Most block cache and inode cache can be discarded without holding the lock protecting that cache. Exceptions are cases where data must be flushed to disk in the process of discarding the lock (e.g., the OneFS® coalescer), or where the cache is protected by multiple locks in a nontrivial way (e.g., the OneFS® restripe cursor block).

Figure 4:
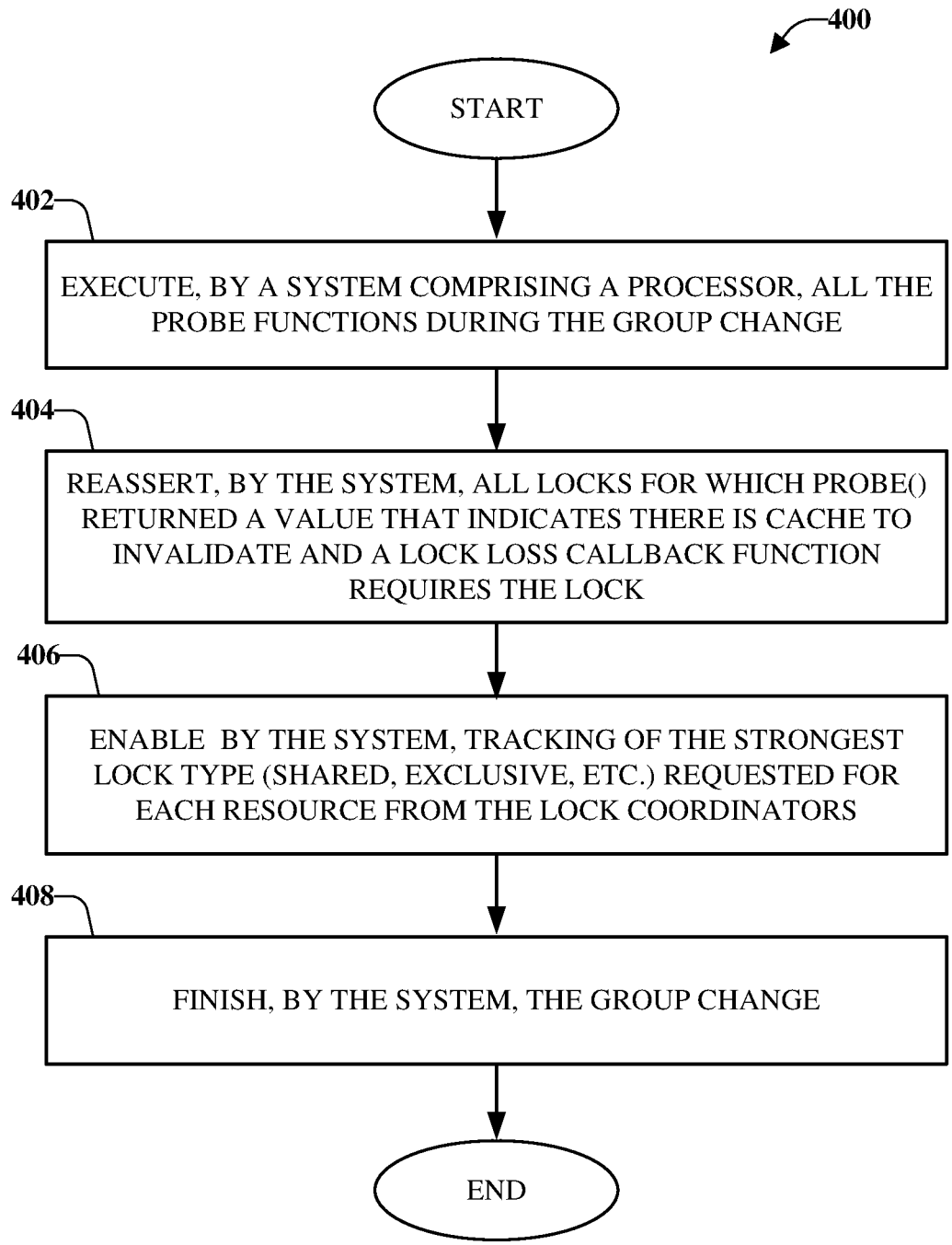
FIG. 4 illustrates a flow diagram of an example, non-limiting, computer-implemented method that manages lock coordinator rebalance in accordance with one or more embodiments described herein.

By implementing the embodiments provided herein with this improved probe function, the lock reassertion during group change can be modified as discussed with respect to FIG. 4, which illustrates a flow diagram of an example, non-limiting, computer-implemented method 400 that manages lock coordinator rebalance in accordance with one or more embodiments described herein.

At 402 of the computer-implemented method, a system comprising a processor can run (or execute) all the probe functions during the group change. These local functions should be much faster than the message per lock sent to the coordinator to reassert the lock. Further, at 404, the system can reassert all locks for which probe( ) returned a value that indicates there is cache to invalidate, and the llcb thread requires the lock (e.g., the third value discussed above)).

The system can enable tracking of the strongest lock type (shared, exclusive, etc.) requested for each resource from the lock coordinators, at 406 of the computer-implemented method 400. At 408, the system can finish the group change.

Figure 5:
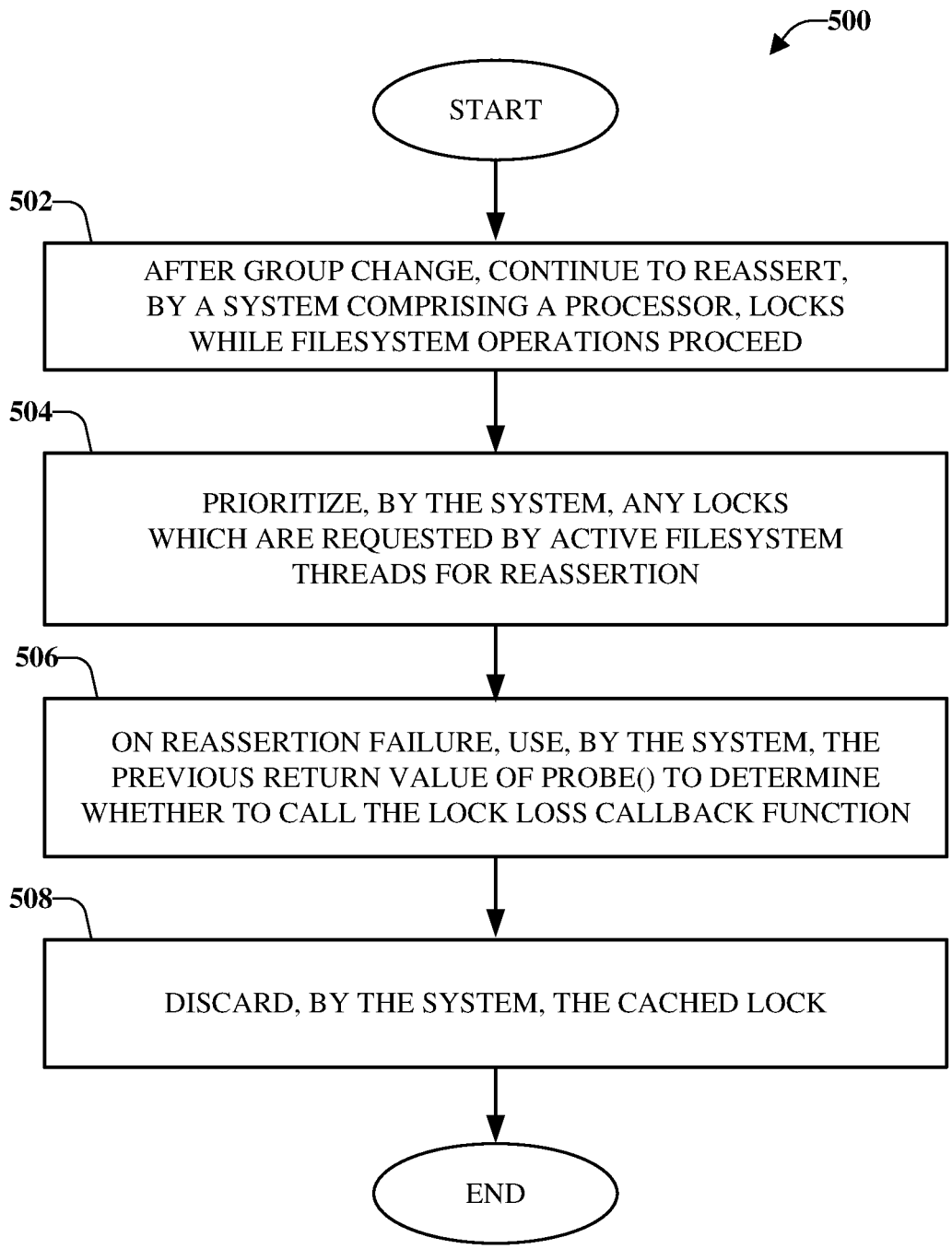
FIG. 5 illustrates a flow diagram of an example, non-limiting, computer-implemented method that implements deferred lock assertion and cache invalidation after group change in accordance with one or more embodiments described herein.

FIG. 5 illustrates a flow diagram of an example, non-limiting, computer-implemented method 500 that implements deferred lock assertion and cache invalidation after group change in accordance with one or more embodiments described herein.

After group change, at 502, the system (e.g., via initiator nodes) will continue to reassert locks while filesystem operations proceed. Any locks which are requested by active filesystem threads will be prioritized for reassertion, at 504.

On reassertion failure, the system (e.g., via a lock initiator) can use the previous return value of probe( ) to determine whether to call the llcb, at 506. The system will then discard the cached lock, at 508. Once the lock has been discarded, it can be acquired normally by a standard lock request. Once all nodes have finished asserting all cached locks, the coordinators will be notified to discard their lock type tracking.

Figure 6:
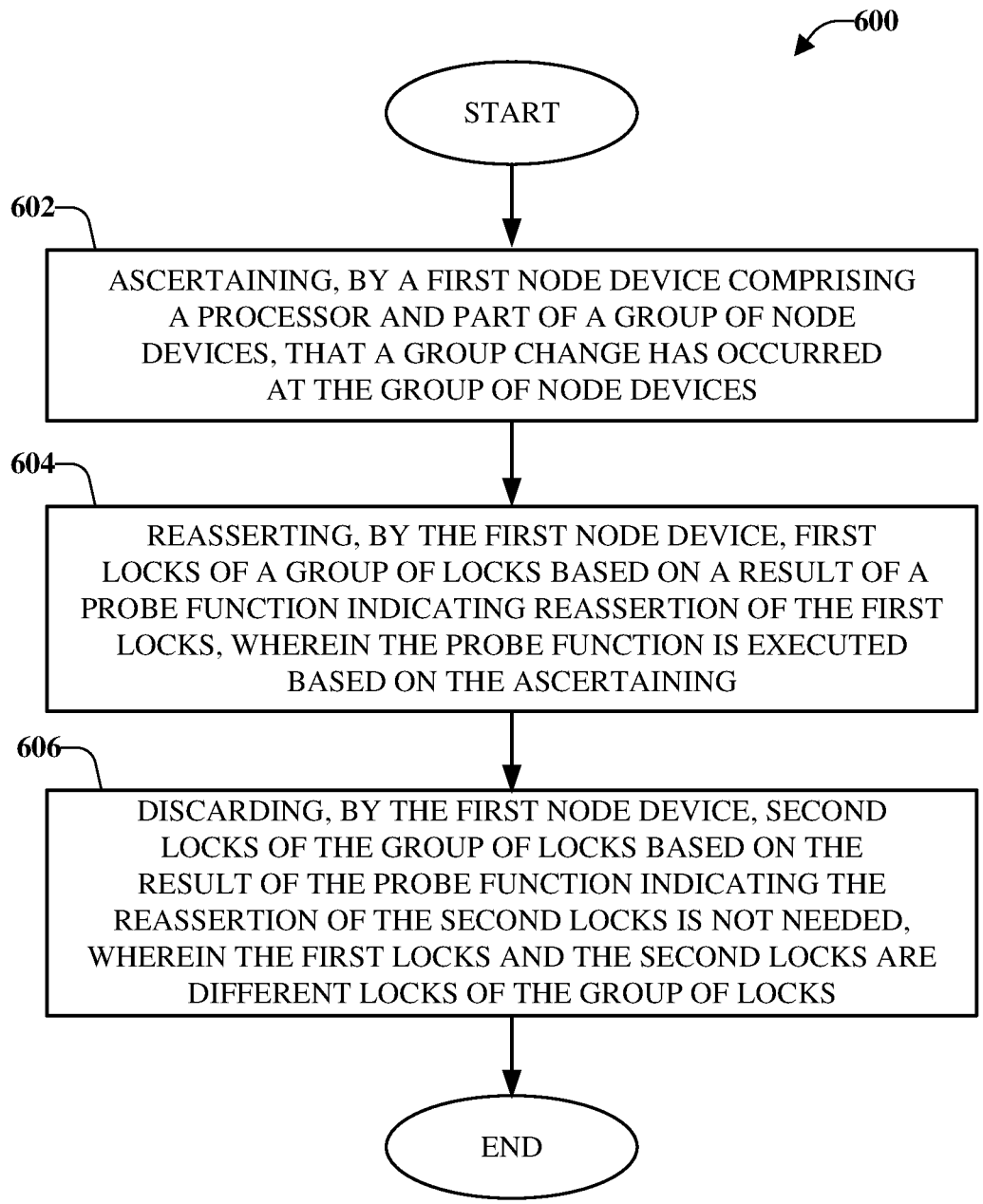
FIG. 6 illustrates a flow diagram of an example, non-limiting, computer-implemented method that selectively reasserts locks after group change in accordance with one or more embodiments described herein.

FIG. 6 illustrates a flow diagram of an example, non-limiting, computer-implemented method 600 that selectively reasserts locks after group change in accordance with one or more embodiments described herein.

The computer-implemented method 600 begins, at 602, when a first node device comprising a processor and part of a group of node devices ascertains that a group change has occurred at the group of node devices. The determination can be made prior to the group change occurring, during the group change, or after completion of the group change. The group change can comprise at least one of an additional node added to the group of node devices and a removal of a node from the group of node devices.

The first node device can reassert, at 604, first locks of a group of locks based on a result of a probe function indicating reassertion of the first locks. The group of locks can be exclusive locks in a distributed file system. The probe function can be executed by the first node device upon or after ascertaining that the group node change has occurred at 602. Executing the probe function can include bypassing a coordinator node included in the group of node devices.

According to some implementations, reasserting the first locks can comprise determining that a lock loss callback thread uses respective locks of the first locks and that respective cache associated with a thread is available for invalidation.

Second locks of the group of locks can be discarded by the first node device. For example, the second locks of the group of locks can be discarded based on the result of the probe function indicating the reassertion of the second locks is not needed. The first locks and the second locks are different locks of the group of locks. In some implementations, discarding the second locks can comprise determining a lock loss callback thread does not use respective locks of the first locks and that respective cache associated with a thread is available for invalidation. Alternatively or additionally, discarding the second locks can comprise determining no cache is to be invalidated.

Figure 7:
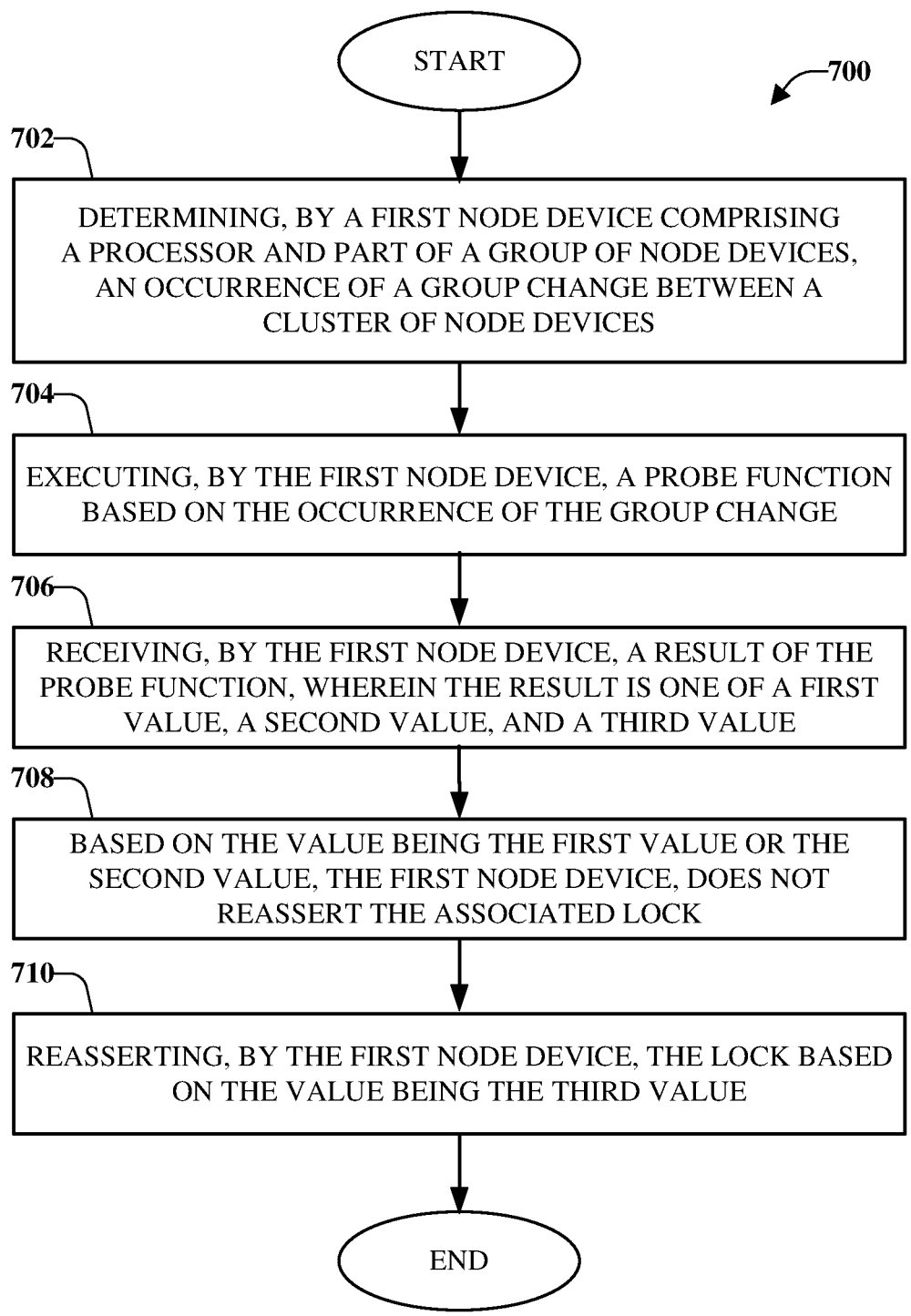
FIG. 7 illustrates a flow diagram of an example, non-limiting, computer-implemented method that reasserts a first set of locks and does not reassert a second set of locks after group change in accordance with one or more embodiments described herein.

FIG. 7 illustrates a flow diagram of an example, non-limiting, computer-implemented method 700 that reasserts a first set of locks and does not reassert a second set of locks after group change in accordance with one or more embodiments described herein.

The computer-implemented method 700 starts, at 702, when a node device of a cluster of node devices, configured to operate as a distributed file system, detects an occurrence of a group change between a cluster of node devices. Upon or after the determination of the occurrence of the group change, at 704, the first node device executes a probe function. Executing the probe function can comprise executing local functions while bypassing a coordinator node included in the cluster of node devices.

At 706, a value from a group of values is received as a result of the probe function. The probe function can return one of three values. For example, a first value can provide first information that indicates there is no cache to invalidate. A second value can provide second information that indicates there is cache to invalidate, but the llcb thread does not require the lock. A third value can provide third information that indicates there is cache to invalidate, and the llcb thread requires the lock. It is noted that although discussed with respect to a first value, a second value, a third value, first information, second information, and third information, and so on as used herein is for purposes of distinguishing the values and/or information from one another and is not meant to indicate a particular order of the values and/or information.

Based on the value being the first value or the second value, one or more locks associated with the first value or the second value are not reasserted, as indicated at 708. Further, based on the value being the third value, the first node device reasserts one or more locks associated with the third value, at 710. A second set of locks of the respective locks, different from the first set of locks, are not reasserted based on a result of the probe function.

Figure 8:
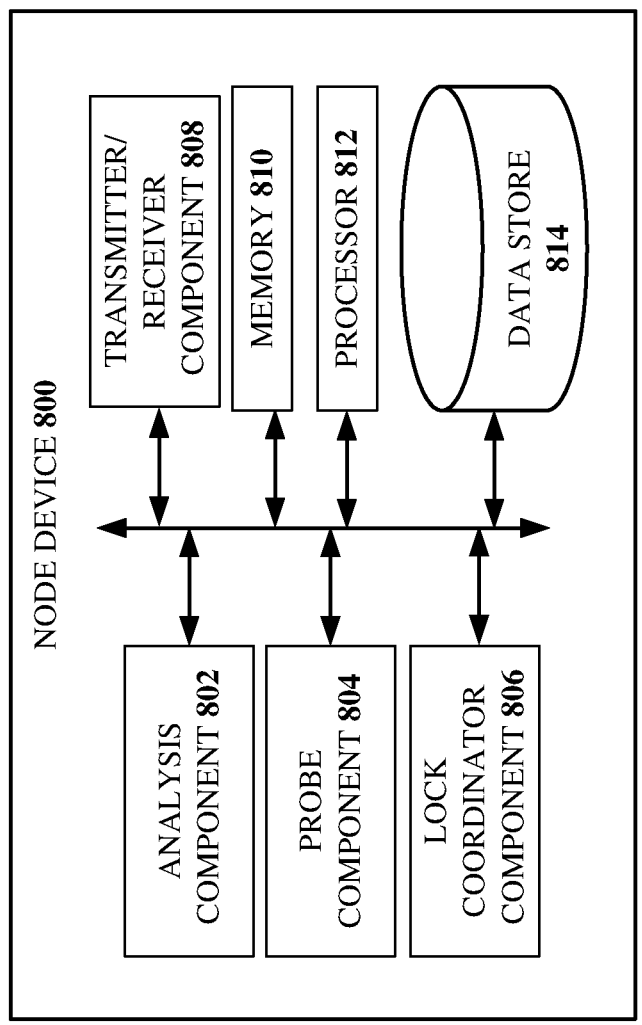
FIG. 8 illustrates an example, non-limiting, node device for managing lock resources in distributed file systems in accordance with one or more embodiments described herein.

FIG. 8 illustrates an example, non-limiting, node device 800 for managing lock resources in distributed file systems in accordance with one or more embodiments described herein. The node device 800 can comprise one or more of the components and/or functionality of the computing devices of FIG. 1 and/or the computer-implemented methods, and vice versa.

Aspects of devices (e.g., the node device 800 and the like), system, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the node device 800 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the node device 800 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The node device 800 can comprise an analysis component 802, a probe component 804, a lock coordinator manager component 806, a transmitter/receiver component 808, at least one memory 810, at least one processor 812, and at least one data store 814. The analysis component 802 can determine whether a group change has occurred (or is occurring) between two or more nodes of a distributed file system. For example, the analysis component 802 can determine removal of one or more existing node devices from the cluster of node devices and/or an addition of one or more new node devices to the cluster of node devices.

The probe component 804 can be configured to execute (or implement execution by another component of) a probe function. The probe function can be location functions that are faster than a message per lock that is conventionally sent to the coordinator node to reassert the lock. The probe function indicates whether any cache invalidation is needed. If something is to be invalidated, a second function (referred to as a lock loss callback or llcb) is called to invalidate the cache. During the probe function, the thread running the probe does not hold the lock that is to be released. In contrast, during the llcb, the thread does hold the lock. Holding the lock during the llcb is not acceptable when invalidating cache during failed lock reassertion since the cache should be destroyed before any thread acquires the lock.

Accordingly, as discussed herein, the probe function executed by the probe component 804 can return one of three possible values (as compared to only two values associated with conventional probe functions). A first value can indicate there is no cache to invalidate. A second value can indicate there is cache to invalidate and the llcb thread does not need the lock. A third value can indicate there is cache to invalidate and the llcb thread does need the lock. The return of the third value can be rare since most block cache and inode cache can be discarded without holding the lock protecting the cache. Exceptions include cases where data is to be flushed to disk in the process of discarding the lock or where the cache is protected by multiple locks in a nontrivial manner.

Upon or after the third value is returned (e.g., there is cache to invalidate and the llcb thread needs the lock), the lock coordinator manager component 806 can reassert the lock during (or after) group change. To selectively reassert the lock, the lock coordinator manager component 806 can reassert all locks for which the probe function returned the third value (lock required on llcb thread). Further, the lock coordinator manager component 806 can enable tracking of the strongest lock type (e.g., shared, exclusive, and so on) requested for each resource from the lock coordinator. Thereafter, the group change is finished.

After group change, the initiator nodes can continue to reassert locks while filesystem operations proceed. Any locks which are requested by active filesystem threads will be prioritized for reassertion. On reassertion failure, the lock initiator can use the previous return value of probe( ) (e.g., the probe function) to determine whether to call the llcb, and will then discard the cached lock. Once the lock has been discarded, it can be acquired normally by a standard lock request. Once all nodes have finished asserting all cached locks, the coordinators will be notified to discard their lock type tracking.

The at least one memory 810 can be operatively connected to the at least one processor 812. The at least one memory 810 can store executable instructions and/or computer executable components (e.g., the analysis component 802, the probe component 804, the lock coordinator manager component 806, the transmitter/receiver component 808, and so on) that, when executed by the at least one processor 812 can facilitate performance of operations (e.g., the operations discussed with respect to the various methods and/or systems discussed herein). Further, the at least one processor 812 can be utilized to execute computer executable components (e.g., the analysis component 802, the probe component 804, the lock coordinator manager component 806, the transmitter/receiver component 808, and so on) stored in the at least one memory 810.

For example, the at least one memory 810 can store protocols associated with selectively reasserting locks after group change in distributed file systems as discussed herein. Further, the at least one memory 810 can facilitate action to control communication between the node device 800 and other node devices, one or more file storage systems, one or more devices, such that the node device 800 employ stored protocols and/or algorithms to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 812 can facilitate respective analysis of information related to managing lock coordinator rebalance in distributed file systems, for example, facilitating deferred lock assertion and cache invalidation during lock coordinator rebalance in distributed file system. The at least one processor 812 can be a processor dedicated to analyzing and/or generating information received, a processor that controls one or more components of the node device 800, and/or a processor that both analyzes and generates information received and controls one or more components of the node device 800.

The transmitter/receiver component 808 can be configured to transmit to, and/or receive data from, for example, nodes, a probe function, and/or communication devices. Through the transmitter/receiver component 808, the node device 800 can concurrently transmit and receive data, can transmit and receive data at different times, or combinations thereof.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "node device," "first node device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
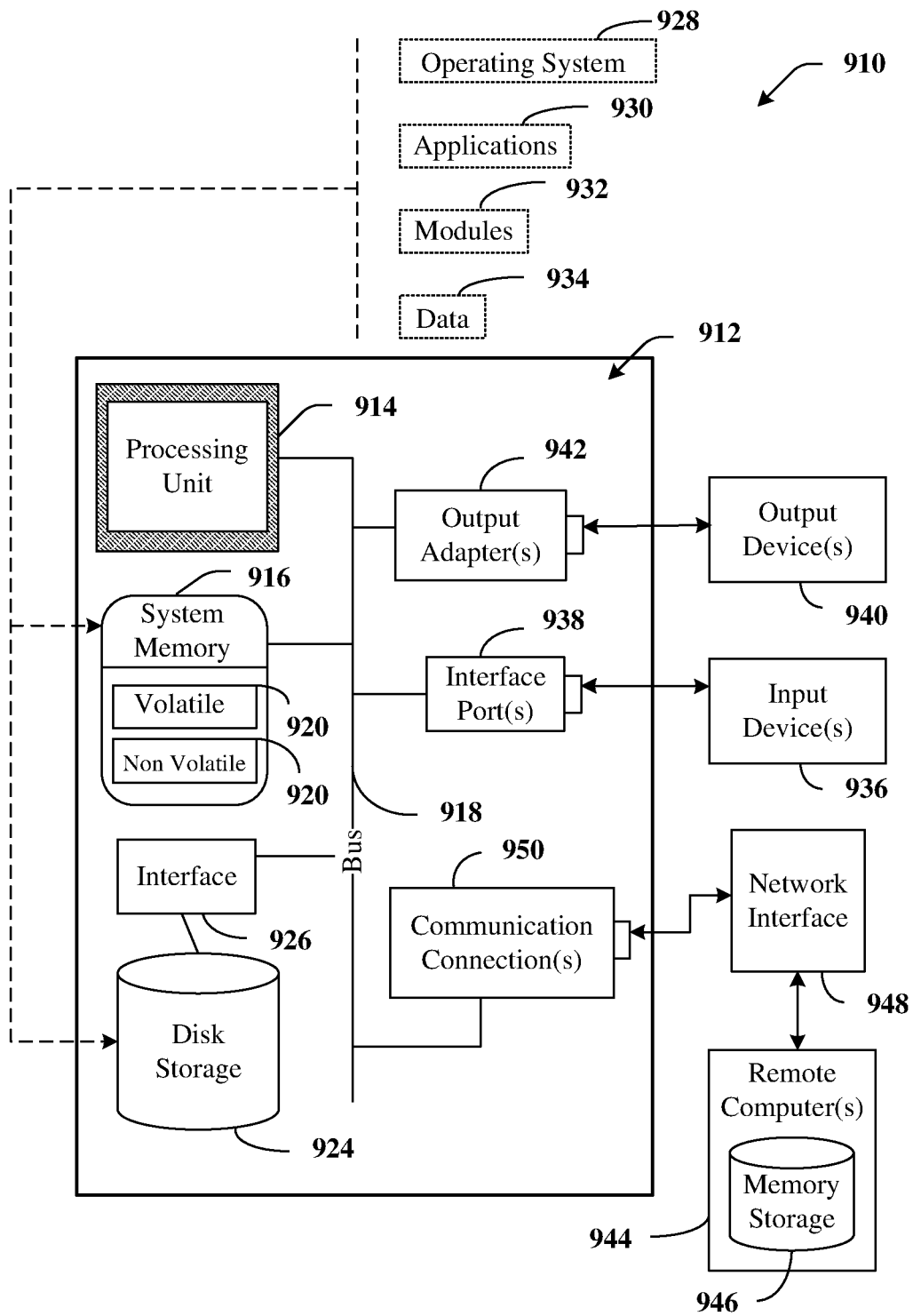
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
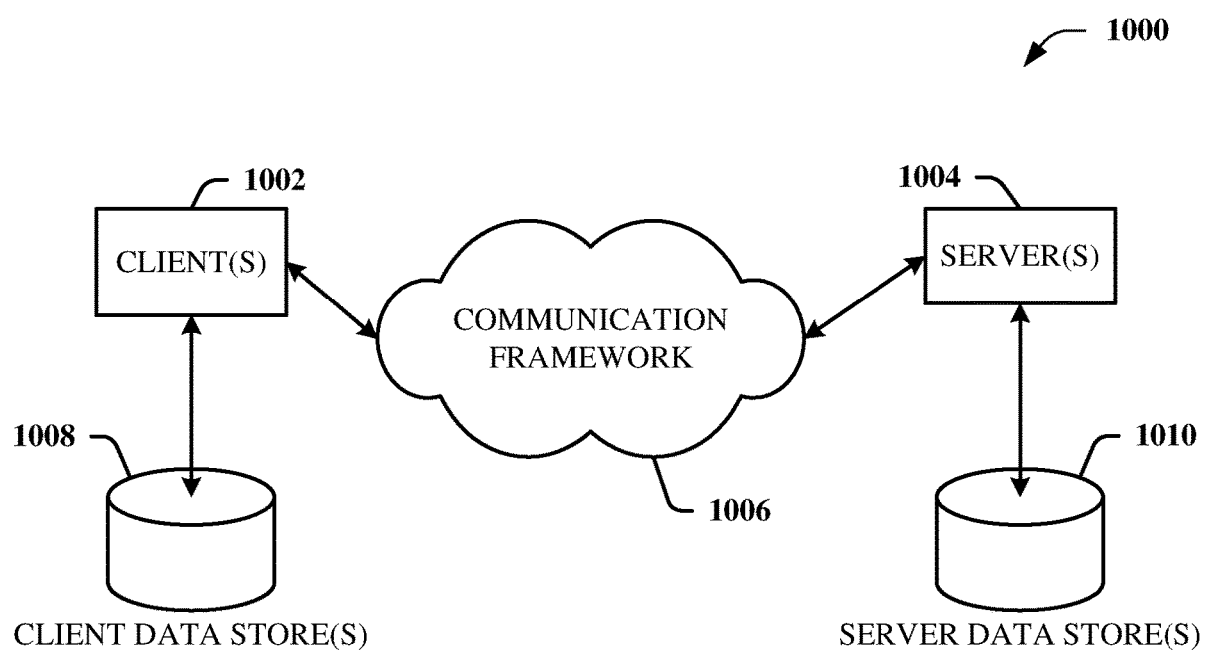
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
determining an occurrence of a group change between a cluster of node devices;
executing a probe function based on the occurrence of the group change;
receiving a set of values in response to the probe function, wherein the set of values comprises a first value, a second value, and a third value;
determining that first locks of a group of locks are associated with the first value and the second value;
determining that second locks, other than the first locks of the group of locks, are associated with the third value; and
reasserting the second locks based on a result of the probe function indicating reassertion of the second locks, wherein the first locks are not reasserted based on the result of the probe function.

2. The system of claim 1, wherein the reasserting the second locks comprises determining that a lock loss callback thread uses respective locks of the second locks and that respective cache associated with a thread is available for invalidation.

3. The system of claim 1,
wherein the first value of the set of values indicates no cache is to be invalidated, wherein the second value of the set of values indicates a lock loss callback thread does not utilize a lock and respective cache associated with a thread is available for invalidation, and wherein the third value of the set of values indicates the lock loss callback thread utilizes the lock and that respective cache associated with the thread is available for invalidation.

4. The system of claim 1, wherein the determining the occurrence of the group change comprises:
determining a removal of an existing node device from the cluster of node devices;
determining an addition of a new node device to the cluster of node devices; or
determining both the removal of the existing node device and the addition of the new node device.

5. The system of claim 1, wherein incompatible locks are created when two threads hold exclusive locks on a same resource.

6. The system of claim 1, wherein the executing the probe function comprises executing local functions while bypassing a coordinator node included in the cluster of node devices.

7. The system of claim 1, wherein the operations further comprise:
discarding block cache and inode cache associated with the first locks.

8. The system of claim 1, wherein a lock of the group of locks is associated with a lock coordinator node between the cluster of node devices, and wherein the operations further comprise:
enabling tracking of a defined lock type requested for each resource from the lock coordinator node.

9. The system of claim 1, wherein the cluster of node devices operate as a distributed file system.

10. A method, comprising:
ascertaining, by a first node device comprising a processor and part of a group of node devices, that a group change has occurred at the group of node devices;
in response to a probe function executed based on the ascertaining, receiving, by the first node device, a set of values that comprise a first value, a second value, and a third value;
determining, by the first node device, that first locks of a set of locks are associated with the first value and the second value and that second locks of the set of locks are associated with the third value, wherein the first locks and the second locks are different locks of the set of locks;
reasserting, by the first node device, the second first locks of a group of locks based on a result of the probe function indicating reassertion of the second locks; and
discarding, by the first node device, the first locks based on the result of the probe function indicating the reassertion of the first locks is not needed, wherein the first value of the set of values indicates no cache is to be invalidated, wherein the second value of the set of values indicates a lock loss callback thread does not utilize a lock and respective cache associated with a thread is available for invalidation, and wherein the third value of the set of values indicates the lock loss callback thread utilizes the lock and that respective cache associated with the thread is available for invalidation.

11. The method of claim 10, wherein the reasserting the second locks comprises determining a lock loss callback thread uses respective locks of the second locks and that respective cache associated with a thread is available for invalidation.

12. The method of claim 10, wherein the discarding the first locks comprises determining a lock loss callback thread does not use respective locks of the second locks and that respective cache associated with a thread is available for invalidation.

13. The method of claim 10, wherein the discarding the first locks comprises determining no cache is to be invalidated.

14. The method of claim 10, further comprising:
prior to the reasserting, executing the probe function comprising bypassing a coordinator node included in the group of node devices based on execution of one or more local functions.

15. The method of claim 10, wherein the group of locks are exclusive locks in a distributed file system.

16. The method of claim 10, wherein the group change comprises at least one of an additional node added to the group of node devices and a removal of a node from the group of node devices.

17. A non-transitory machine-readable medium, comprising executable instructions that, when executed by a processor, facilitate performance of operations, comprising:
executing a probe function based on a determination that a group change is occurring at a cluster of node devices configured to operate as a distributed file system, wherein the probe function evaluates respective locks and associated cache of a group of resources, wherein the respective locks comprise a first set of locks and a second set of locks different from the first set of locks;
receiving a set of values in response to the probe function, wherein the set of values comprise a first value, a second value, and a third value;
determining that the second set of locks are associated with the first value and the second value, and that the first set of locks are associated with the third value;
determining the first set of locks of the respective locks are to be reasserted based on results of the probe function; and
reasserting the first set of locks, wherein the second set of locks are not reasserted based on the results of the probe function.

18. The non-transitory machine-readable medium of claim 17, wherein the reasserting the first set of locks comprises determining that a lock loss callback thread uses respective locks of the first set of locks and that respective cache associated with a thread is available for invalidation.

19. The non-transitory machine-readable medium of claim 17, wherein the executing the probe function comprises executing local functions while bypassing a coordinator node included in the cluster of node devices.

20. The non-transitory machine-readable medium of claim 17, wherein the first value of the set of values indicates no cache is to be invalidated, wherein the second value of the set of values indicates a lock loss callback thread does not utilize a lock and respective cache associated with a thread is available for invalidation, and wherein the third value of the set of values indicates the lock loss callback thread utilizes the lock and that respective cache associated with the thread is available for invalidation.

* * * * *